Figure 1:
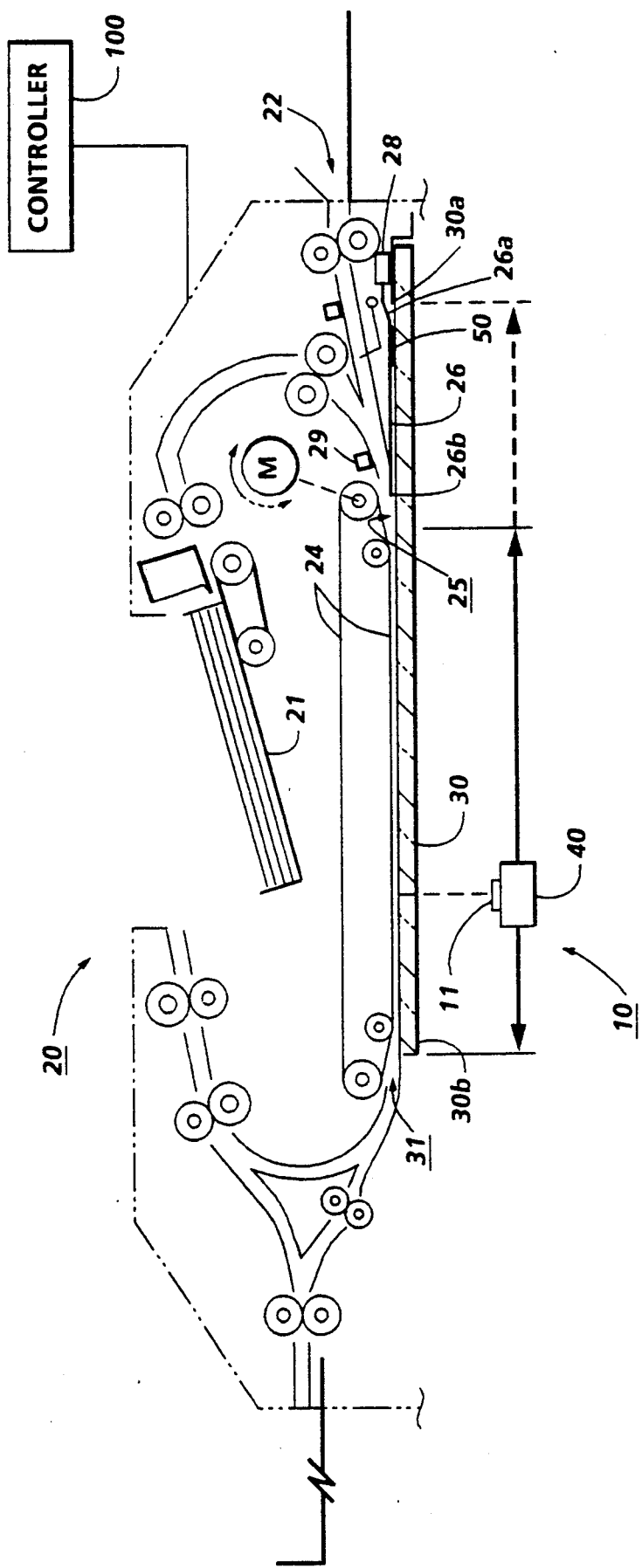

United States Patent [19]

Graves et al.

[11] Patent Number: 5,119,213
[45] Date of Patent: Jun. 2, 1992

[54] SCANNER DOCUMENT ABSENCE CODE SYSTEM

[75] Inventors: James R. Graves, Ontario; James E. Summers, Fairport, both of N.Y.

[73] Assignee: Xerox Corporation, Stamford, Conn.

[21] Appl. No.: 559,020

[22] Filed: Jul. 27, 1990

[51] Int. Cl.⁵ .............................................. H04N 1/04
[52] U.S. Cl. .................... 358/488; 358/474; 358/497; 358/498; 235/375; 235/454; 235/462; 235/480; 271/227; 271/258; 355/75; 355/230; 355/308
[58] Field of Search ............... 358/474, 488, 497, 498, 358/449; 235/375, 480, 454, 462; 271/227, 258; 355/230, 308, 75

[56] References Cited

U.S. PATENT DOCUMENTS

| | | | |
|---|---|---|---|
| 3,945,728 | 3/1976 | Crandell | 355/75 |
| 4,314,159 | 2/1982 | Davis | 358/496 |
| 4,357,095 | 11/1982 | Sugawa et al. | 355/3 R |
| 4,659,214 | 4/1987 | Takemura et al. | 355/75 |
| 4,757,348 | 7/1988 | Rourke et al. | 355/6 |

OTHER PUBLICATIONS

Xerox Disclosure Journal, vol. 8, No. 2, Mar./Apr. 1983, pp. 161-162, Document Edge Detection Design for a CVT Image Input Module, W. H. Bruce et al.

Xerox Disclosure Journal, vol. 11, No. 1, Jan./Feb. 1986.

Xerox Disclosure Journal, vol. 12, No. 5, Sep./Oct. 1987, pp. 239-240, Sheet on Platen Sensor for Determining Mode Priorities, T. Acquaviva et al.

Primary Examiner—Edward L. Coles, Sr.
Assistant Examiner—Edward Lefkowitz

[57] ABSTRACT

In an electronic imaging system in which a document is electronically imaged on a platen by a scanning electronic imager, a document for which manual handling is desired is manually positioned in a special manual registration position on the platen in which one corner of the document underlies a unique signal generating optical indicia positioned over that corner of the platen. Preferably, this optical indicia is a uniquely numbered bar code pattern on a stationary baffle, or other overlying surface, upstream of the document feeder platen transport, and preferably located in a start of scan area. The electronic imager is at least partially optically occluded from reading that unique bar code pattern by a document present in that manual registration position. (A document for which automatic feeding is desired may be placed in a document feeder and fed thereby onto the platen into a different registration position in which no portion of that document is interposed between that bar code and the imager.) The imager can read, or not read, that unique bar code to provide a unique control signal to control the document feeder and/or provide other desired functions, such as indicating that a previously manually placed document was left on the platen.

15 Claims, 3 Drawing Sheets

SCANNER DOCUMENT ABSENCE CODE SYSTEM

Cross-reference is made to a copending application of the same assignee, filed Jul. 2, 1990 as U.S. application Ser. No. 07/546,984, and issued Jun. 25, 1991 as U.S. Patent No. 5,026,044 and entitled "Dual Mode Document Registration System", disclosing the same basic exemplary document handling and electronic platen scanning system also disclosed herein.

The present invention relates to an electronic document imaging system, with a document imaging platen, providing an automatic system utilizing the electronic imaging system to detect the presence or absence of a document in an imaging position on the document imaging platen by detection of a superposed unique optical indicia on the imaging system in said imaging position, to provide control information.

As additionally disclosed herein, said control information may be utilized for operator displays and/or inhibiting or otherwise controlling the operation of an integral document handling or feeding apparatus for feeding documents to said document imaging platen, and/or providing document input mode selection, and/or imaging area or image scanning position selection, and/or preventing duplicate image capture of the same document, and/or preventing potential fault conditions, operator confusion and/or recovery time loss, and/or jams or document damage especially in cases where a previously manually placed document is inadvertently left on the platen and document feeding of other documents would otherwise be attempted.

The need to optionally place some documents onto an imaging platen manually, rather than automatically with a document feeder, and the frequent failure of copier or scanner operators to remember to subsequently remove such manually placed documents after their imaging, with adverse consequences, is a well known problem, for which some previous attempted solutions have been provided, as sknown by art cited below.

There is disclosed in the embodiment herein an electronic document imaging system, preferably of the document imaging platen scanning type, having an automatic document registration and presence or absence detection system utilizing a unique stationary optical indicia overlying a selected portion of said document imaging platen which may be optically imaged by said electronic document imaging system to produce a unique electrical signal in the absence of an occluding document under desired document input conditions.

Another disclosed feature is that the absence of said unique electrical control signal by not imaging said unique optical indicia when it is occluded by a document thereunder provides a control signal for inhibiting the operation of a document handling or feeding apparatus for feeding documents to said imaging platen.

There is further disclosed in the embodiment herein an electronic document imaging system in which documents to be stationarily imaged after manual document placement on an imaging platen thereof are positioned in a special manual document placement imaging registration position in which at least one corner of the document is placed under an overlying stationary imaging background surface member bearing an optically detectable bar code patch or the like unique optical signal generating indicia, so that said document in said position can optically occlude said unique optical indicia from being read by said electronic document imaging system. As further disclosed, said electronic document imaging system optically reads and is within focus of said unique optical indicia to generate a unique electrical control signal by imaging said unique optical indicia when said unique optical indicia is not occluded by any portion of a document thereunder.

A further disclosed feature is that said manual placement document registration and imaging position for electronic document scanning may be a different position from the registration and imaging positions on said imaging platen for automatic or semiautomatic document feeding by a document feeder.

Another disclosed feature is that documents in said other imaging positions on said imaging platen provided for automatic or semiautomatic document feeding may not occlude said unique optical indicia, but said unique optical indicia may not be within in said automatic or semiautomatic document feeding imaging positions so as not to be accidentally imaged or to interfere with said document feeding.

Another disclosed feature is that the manual placement document registration position may be corner registered to a corner of the platen not covered by a platen document transport and overlayable by a stationary imaging background surface member bearing said unique optical signal generating indicia overlying that registration corner of the platen.

Another disclosed feature is that those documents automatically fed onto said imaging platen by the document feeder for imaging are registered in a downstream position on said platen calculated and fed from the trailing edge of those documents by a platen transport belt system, whereas documents manually placed on said platen for imaging are registered to an upstream registration edge of said platen, and this is preferably upstream of any platen transport belt system and underlying a stationary imaging background surface member which is desirably imprinted with a unique optical bar code pattern not used on any documents.

Another disclosed feature is that the electronic document imaging system may be a document scanner which may be specially programmed in a document detection mode or special pre-scan mode to start scanning the platen in the area of said unique optical indicia (in said manual placement registration position), and preferably prior to scanning other imaging areas of said platen.

Further disclosed features or advantages include the fact that no separate physical document-on-platen sensing devices are required, which could intrude into the optics path to cause image blocking or copying defects. The existing under-platen document imaging (image scanner) system is utilized. Also, no added electronics or hardware are required for the image scanner, and the presence of almost any type or size document in the manual imaging position can be detected, as long as the document is not fully transparent over the entire area of the overlying unique optical indicia patch. i.e., even partial occlusion thereof by document opaqueness or translucence or a document image may be detected by non-reading and non-generation of the entire numerical or other indicia control signal produced by the reading of the fully unobstructed unique optical indicia by the electronic document imaging system.

By way of background, the present system should be distinguished from various prior art systems for attempting to detect the presence or absence or position or size of a document on the imaging platen of a conventional optical (non-electronic imaging) copier. This has been variously attempted with a conventional separate optical light beam reflective sensors such as, for example, U.S. Pat. Nos. 3,689,143, 4,281,919, 4,344,703, 4,366,219, 4,338,020, 4,456,372, 4,568,181, 4,585,332, or 4,391,505 or Xerox Disclosure Journals Vol. 11 No. 1., p. 33. February 1986 Vol. 12, No. 5., p. 239–40, October 1987; or, in a moving platen system, by reflection of document illumination lamp light, as in U.S. Pat. Nos. 4,357,095, 4,505,574, or 4,659,214. Another way of attempting to detect the presence of a document on the imaging platen of a conventional copier, to inhibit feeder operation, is by inference from opening and/or closing the platen cover, and/or a time delay, such as, for example, U.S. Pat. No. 3,945,728 or Xerox Corporation U.K 1,745,094 (reissued) (D/72384).

As taught in the above and other art, there is a long standing problem in the tendency of operators to accidentally leave a manually placed document on the platen after it is copied, unless it is automatically sensed and the operator is promptly warned by a visual display to remove it. Furthermore, in a normal plural mode document handling system with automatic feeding, if a previously manually placed document is not removed from the platen before automatic feeding of another document, either undesired mechanical ejection of the document or a misfeed or jam may occur. Many of these document-on-platen or document edge detection systems only work with plural platen transport belts with an optical document sensor looking through (optically undesirable) spaces between the belts, or by looking through an optically undesirable or shuttered hole in a document belt.

Further by way of background, as to attempting to better optically detect or recognize a document edge or area on a platen for other reasons, an otherwise conventional optical copier, but with a platen cover with marks or patterns of fluorescent paint on the platen cover, is disclosed in U.S. Pat. No. 4,415,261. It is also known to use a yellow belt, or other such colored platen cover, as in Canon document platen feeders, so that the edges of a white document can be better optically detected thereunder by the increased optical contrast as compared to a normal white platen cover.

Specular/diffuse paper sheet distinguishing optical sheet sensors per se are known for example from U.S. Pat. No. 4,540,887. They also illustrate the difficulty of optically detecting documents versus background surface.

A document edge detection design for a moving document electronic imaging system, using the CCD scanning array itself, in cooperation with a highly reflective target 9, is disclosed in Xerox Disclosure Journal Vol. 8, No. 2, March/April 1983, pp. 161-2.

As to the disclosed exemplary document handler (DH) or feeder per se, it may desirably, with only minor modifications as described herein, be of a type generally known for conventional optical copiers rather than electronic document scanner imaging systems. Disclosed herein by way of example is a known dual document input type, an RDH/SADH. RDH/SADH is a common abbreviation for a well known type of document handler with a top tray loading recirculating document handler (RDH) and an integral alternative side document entrance or SADH slot providing a semiautomatic document handler (SADH) unidirectional input. However, this is merely exemplary, and the present invention is not limited to any particular type of document handler or document feeder.

This disclosed DH system allows documents to be automatically or semiautomatically fed onto an imaging platen at an infeeding position substantially downstream of the upstream end area of a large platen, to provide a shorter feeding path for normal sized documents, yet can utilize the full area of the large platen, including said upstream end area, to stationarily image large or delicate documents manually thereon.

As noted, the subject system is for document manual placement or feeding and registration for electronic document imaging, for ultimate electronic printing of the electronic document page images after electronic storage and processing and page reordering, rather than a conventional light lens optical imaging copier system, as in most of the art cited herein. An example of such an electronic document imaging and printing system is disclosed in Xerox Corporation U.S. Pat. No. 4,757,348 issued Jul. 12, 1988 to Rourke, et al. That U.S. Pat. No. 4,757,348 and commonly filed U.S. Pat. No. 4,716,438 issued Dec. 29, 1987 also disclose bar coded document control sheets or job tickets, and bar code reading and discrimination and copying controls. That is compatibly usable with the present system, if desired. Among many other examples of platen scanning electronic imaging systems per se are Xerox Corporation U.S. Pat. No. 4,295,167 or related U.S. Pat. No. 4,287,536. The terms copying and imaging are used interchangeably in this particular case to refer to electronic image scanning.

Also as to specific hardware components of the subject apparatus, it will be appreciated that, as is normally the case, various such specific hardware components are known per se in other apparatus or applications, including that described in art cited herein, and need not be redescribed. A unique one of the optical bar code patterns (a unique bar coded number not corresponding to any job or document code) disclosed in the above-cited Xerox Corporation U.S. Pat, No. 4,757,348 or 4,716,438 may be used for the different purpose described herein. Particularly noted re the servo driven document platen transport belt and registration system is Xerox Corporation U.S. Pat. No. 4,579,444, issued Apr. 1, 1986 to Pickney and Sanchez (D/84074), and art cited therein, and the corresponding Xerox Corporation "1065" copier RDH. Said '444 patent is of appropriate background interest as illustrating the general nature of the specific embodiment of the disclosed document handler and platen. The disclosed infeeding baffle or feed-on flap is somewhat similar that shown in Xerox Disclosure Journal (XDJ) Vol. 7, No. 4., July/August 1982, p. 275.

This XDJ publication and said U.S. Pat. No. 4,579,444 reference both point out the undesirability and disadvantages of using fixed gate or stop finger registration systems into which a document is driven or impacted. These and other references teach the desirability of the present system in providing alternative automatic document feeding with non-slip engagement of the platen transport belt with the document, and document registration by a controlled stopping position of the transport belt holding the document, rather than by mechanical gates, fingers, or edge stops engaging and stopping the document.

As noted in the prior art, as xerographic and other copiers increase in speed, and become more automatic, it is increasingly important to provide higher speed yet more reliable and more automatic handling of the document sheets being copied, i.e. the input to the copier. Even with slower copying rate copiers, it has become increasingly desirable to provide an automatic document handler (ADH) or feeder (ADF) for automatic feeding from a stack of documents, with the document handler providing all the deskewing, feeding and final registration of the documents into the copying position, and then ejecting the documents from the platen automatically. It is desirable to reliably feed and accurately register for copying document sheets of a variety or mixture of sizes, types, weights, materials, conditions and susceptibility to damage.

Original document handling, particularly for delicate, valuable, thick or irregular documents, is often more difficult and critical than feeding plain paper sheets. The images on documents (and/or their fusing if they are themselves copies), can change the sheet feeding characteristics. These document images may be subject to damage in feeding if not properly handled, especially smearing of freshly typed typewriting ink, ink jet printer ink, etc.. Original documents can vary widely in sheet size, weight, thickness, material, condition, humidity, age, etc.. Documents may have curls, wrinkles, tears, "dog-ears", cut-outs, overlays, tape, paste-ups, punched holes, staples, adhesive, or slippery areas, or other irregularities. Unlike copy sheets, which generally are from the same new clean batches and are therefore of the same general condition and size, documents can often vary considerably even if they are all of the same "standard" size, e.g., letter size, legal size, A-4, B-4, etc.. Documents, even in the same document set, may have come from different paper batches or have variably changed size with different age or humidity conditions, different imaging or fusing, etc.. Yet it is desirable to automatically or semi-automatically rapidly feed, register and copy even a mixture of sizes, types, and conditions of documents without document jams or document damage and with each document correctly and accurately aligned to a desired registration position on the imaging platen.

As noted in the prior art, one of the most difficult to achieve features for automatic document handling is the rapid, accurate, reliable, and safe registration of each document at the proper position for copying. Conventionally the document is desirably either center-registered or corner-registered (depending on the copier) by the document handler automatically at a pre-set registration position relative to the copier platen. At this registration position two orthogonal edges of the document are aligned with two physical or positional (imaginary) registration lines of the copier platen at which the original document is properly aligned with the copier or electronic scanner optics for correct imaging of the document image. this registration accuracy is desirably consistent within approximately one millimeter. If the document is not properly registered, then undesirable dark borders and/or edge shadow images may appear on the ensuing copy sheet, or information near an edge of the document may be lost, i.e. not copied onto the copy sheet. Document misregistration, especially skewing, can also adversely affect further feeding and/or restacking of the documents. As noted in the above-cited Xerox Corporation U.S. Pat. No. 4,579,444, the desired registration (imaging) position of a document may desirably vary with document size in some cases.

A preferred type of copier document handling system is one that can utilize an existing or generally conventional copier optical imaging system. That is, utilizing the external transparent copying window (known as the platen or imaging station) of the copier. It is also desirable that the document handling system be readily removable, as by pivoting away, to alternatively allow the copier operator to conventionally manually place documents, including books, on the same copying platen. Thus, a lighter weight document handler is desirable. Preferably in document handling systems the document is automatically registered for copying overlying a selected portion of full-sized (full-frame) platen which is at least as large as the largest document to be normally copied. In such systems the document is preferably either scanned or flashed while it is held stationary on the platen in the desired registration position. In these full-frame systems the document is preferably registered by being stopped and held during imaging at a preset registration position over the platen glass which is adjacent one side or edge thereof.

As shown in the art and discussed herein, document handling systems have been provided with various document transports to move the documents over the copier platen and into registration. Such document platen transports may comprise single or plural transport belts or feed wheels, utilizing frictional, vacuum, or electrostatic sheet driving forces. Various combinations of such transports are known with various registration devices or systems. Preferably the same platen transport sheet feeder is used to drive a document onto and off of the platen before and after copying, as well as registering the document.

As noted, since forward edge-registration by mechanical or "hard" stopping of the document edge against a mechanical edge, finger or gate is known to be undesirable, other systems have been developed, as shown in the art. As shown in the above-cited Xerox Corporation U.S. Pat. No. 4,579,444 or 4,621,801, art cited therein, etc., document registration can desirably be done without such mechanical document stops on the platen. This can be done by preregistering the document to a platen transport belt with an upstream, off-platen, preregistration document edge sensor, fingers or rollers, and then moving the document a known, preset, distance over the platen on the belt into registration, providing there is no slippage during this entire movement between the document and the belt, i.e., stopping the document platen transport after a preset time period or movement to stop the document on the platen.

Integral side or lateral registration and side edge deskewing of the document is known to be highly desirable. However, such lateral or second axis (side edge) document registration is known to preferably be done upstream of the platen. The present system desirably provides this for all copying modes.

Some other current examples of prior art recirculating document handlers are disclosed in U.S. Pat. Nos. 4,076,408; 4,176,945; 4,278,344; 4,330,197; 4,466,733; and 4,428,667.

In the description herein the term "document" or "sheet" refers to a usually flimsy sheet of paper, plastic, or other such conventional individual image substrate, and not to microfilm or electronic images which are generally much easier to manipulate. The "document" is the sheet (original or previous copy) being imaged, or copied in the copier onto the "copy sheet", which may be abbreviated as the "copy". Related, e.g., page order, plural sheets of documents or copies are referred to as a "set". A "simplex" document or copy sheet is one having its image and page number on only one side or face of the sheet, whereas a "duplex" document or copy sheet has "pages", and normally images, on both sides, i.e., each duplex document and copy is considered to have two opposing sides, faces, or "pages" even though no physical page number may be present.

A specific feature of the specific embodiment disclosed herein is to provide in an electronic document imaging system, with a document imaging platen and an electronic document imager for electronically imaging a document on said imaging platen, the improvement comprising: an automatic document detection system for detecting the presence or absence of a document registered in an imaging position on said document imaging platen utilizing said same electronic document imager, and said automatic document detection system including a platen overlying member of said electronic document imaging system bearing a unique optically readable indicia different from normal optically readable document indicia, and/or said unique optically readable indicia being in a predetermined position superposed over a predetermined portion of said document imaging platen in a predetermined area of said imaging position, and/or said unique optically readable indicia being positioned to be optically occluded by a document on said document imaging platen which is registered in said imaging position so as not to be fully readable by said electronic document imager, and said unique optically readable indicia being positioned to be optically imaged and read by said same electronic document imager to provide a correspondingly unique control signal when a document is not present in said predetermined area of said imaging position.

Further specific features provided by the system disclosed herein, individually or in combination, include those wherein said electronic document imaging system includes an integral document feeder for automatically feeding documents to said document imaging platen, and said control signal is operatively connected to enable the operation of said document feeder in response to said unique control signal indicating that a document is not present on document imaging platen in said predetermined area of said imaging position, and/or wherein said imaging position is a special manual document placement imaging registration position, in which manual placement registration position at least one corner of the document is placed under said platen overlying member and said unique optically readable indicia thereon; and/or and wherein said electronic document imaging system includes an integral document feeder for automatically feeding documents into at least one other, different, automatic registration position on said document imaging platen in which said unique optically readable indicia is not optically occluded by said automatically fed documents; and/or wherein said control signal is operatively connected to enable the operation of said document feeder in response to said unique control signal indicating that a document is not present on said document imaging platen in said manual placement registration position; and/or wherein said integral document feeder includes a moving document platen transport partially overlying said document imaging platen, and wherein said platen overlying member and said unique optically readable indicia thereon and said manual placement registration position extend over an upstream portion of said document imaging platen not overlaid by said document platen transport; and/or said platen overlying member is separate from and do not move with said document platen transport, and wherein said electronic document imager scans said imaging platen for said document imaging, starting said scan from said upstream portion of said imaging platen in which said unique optically readable indicia is located; and/or wherein said control signal is additionally operatively connected to enable operator displays, document input mode selection, imaging area or image scanning position selection, preventing duplicate image capture of the same document, preventing potential fault conditions, or document jams or damage in cases where a previously manually placed document is inadvertently left on said platen and document feeding of other documents is attempted, and/or wherein said manual placement registration position is corner registered to a corner area of said document imaging platen upstream of said document platen transport and said upstream corner area of said document imaging platen is stationarily overlaid by said platen overlying member and said unique optically readable indicia thereon; and/or wherein said platen overlying member is a pivotable light reflective imaging background baffle plate member overlying an area of said document imaging platen between said document platen transport and the end of said document imaging platen from which documents are fed onto said said document imaging platen, which baffle plate member is closely adjacent and generally coplanar said document imaging platen for document imaging, but pivotable for document feeding thereunder; and/or wherein said unique optically readable indicia is a numerical bar code pattern patch readable by said electronic document imager, when not at least partially occluded by a document on said document imaging platen, as a unique bar code number not used on any document to be imaged.

As further disclosed specific features there is shown an electronic document imaging process in which a document is electronically imaged on a document imaging platen by an electronic document imager after the document has been registered in an imaging position on the imaging platen, the improvement wherein: an optically detectable signal generating indicia is overlaid over a portion of the imaging platen during document imaging within focus of and optically readable by the electronic document imager, a document for which manual handling is desired is manually placed and positioned in a first, manual, registration position on the imaging platen in which at least one corner of said manually placed document is interposed between said signal generating optical indicia and the electronic document imager to at least partially optically occlude said optical indicia from being read by said electronic document imager, and a document for which automatic feeding is desired is placed in a document feeder and that document is fed thereby onto the imaging platen into a second, different, registration position on the imaging platen, in which second registration position no portion of that document is interposed between said signal generating optical indicia and the electronic document imager and the signal generating optical indicia is optically read by said electronic document imager to provide a unique control signal responsive thereto; and/or wherein said optically detectable signal generating indicia is a unique bar code pattern, not used on any document to be imaged, read by said electronic document imager, when not optically occluded by any portion of a document, as a unique code number to provide said unique control signal; and/or wherein said optically detectable signal generating indicia is on an imaging background baffle plate member stationary positioned over one edge area of the imaging platen during document imaging; and/or wherein said document feeder feeds documents into said second document registration position with an over-platen document platen transport, and said first manual placement document registration position is corner registered to a corner of the platen not covered by this platen transport and overlaid by a stationary imaging background surface member with said optically detectable signal generating indicia; and/or wherein said electronic document imager is scanned under the document imaging platen for said document imaging, and wherein the start of said scanning starts in said manual registration position with first scanning the area of said optically detectable signal generating indicia, which is a unique optical pattern imprinted on a planar member held in a fixed position, and wherein said electronic document imager is scanned under the document imaging platen for said document imaging, and wherein the start of said scanning starts in said manual registration position with said optically detectable signal generating indicia, prior to scanning the registration position for those documents fed onto the imaging platen by said document feeder for imaging, which are registered in a downstream position on said platen calculated and fed from the trailing edge of those documents by a platen transport belt system of said document feeder, whereas documents manually placed on said platen for imaging are registered to an upstream edge area of said platen upstream of said platen transport belt system and underlying a stationary imaging background surface member imprinted with said optically detectable signal generating indicia, and/or wherein said electronic document imager is scanned starting in a special document-on-platen prescan, automatically initiated in response to preselected combination of document input conditions, under a manual registration position underlying a statinary imaging background surface member imprinted with said optically detectable signal generating indicia.

The disclosed apparatus may be readily operated and controlled in a conventional manner with conventional control systems. Some additional examples of control systems for various prior art copiers with document handlers, including sheet detecting switches, sensors, etc., are disclosed in U.S. Pat. Nos.: 4,054,380; 4,062,061; 4,076,408; 4,078,787; 4,099,860; 4,125,325; 4,132,401; 4,144,550; 4,158,500; 4,176,945; 4,179,215; 4,229,101; 4,278,344; 4,284,270, and 4,475,156. It is well known in general, and preferable, to program and execute such control functions and logic with conventional software instructions for conventional microprocessors. This is taught by the above and other patents and various commercial copiers. Such software will of course vary depending on the particular function and the particular software system and the particular microprocessor or microcomputer system being utilized, but will be available to or readily programmable by those skilled in the applicable arts without undue experimentation from either verbal functional descriptions, such as those provided herein, or prior knowledge of those functions which are conventional, together with general knowledge in the software and computer arts. Controls may alternatively be provided utilizing various other known or suitable hard-wired logic or switching systems. As shown in the above-cited art, the control of exemplary document and copy sheet handling systems in copiers may be accomplished by conventionally actuating them by signals from the copier controller directly or indirectly in response to simple programmed commands and from selected actuation or non-actuation of conventional copier switch inputs by the copier operator, such as switches selecting the number of copies to be made in that run, selecting simplex or duplex copying, selecting whether the documents are simplex or duplex, selecting a copy sheet supply tray, etc. The resultant controller signals may conventionally actuate various conventional electrical solenoid or cam-controlled sheet deflector fingers, motors or clutches in the copier in the selected steps or sequences as programmed. Conventional sheet path sensors, switches and bail bars, connected to the controller, may be utilized for sensing and timing the positions of documents and copy sheets, as is well known in the art, and taught in the above and other patents and products. Known copying systems utilize such conventional microprocessor control circuitry with such connecting switches and sensors for counting and comparing the numbers of document and copy sheets as they are fed and circulated, keeping track of their positions, counting the number of completed document set circulations and completed copies, etc., and thereby controlling the operation of the document and copy sheet feeders and inverters, etc..

All references cited in this specification, and their references, are incorporated by reference herein where appropriate for appropriate teachings of additional or alternative details, features, and/or technical background.

Figure 2:
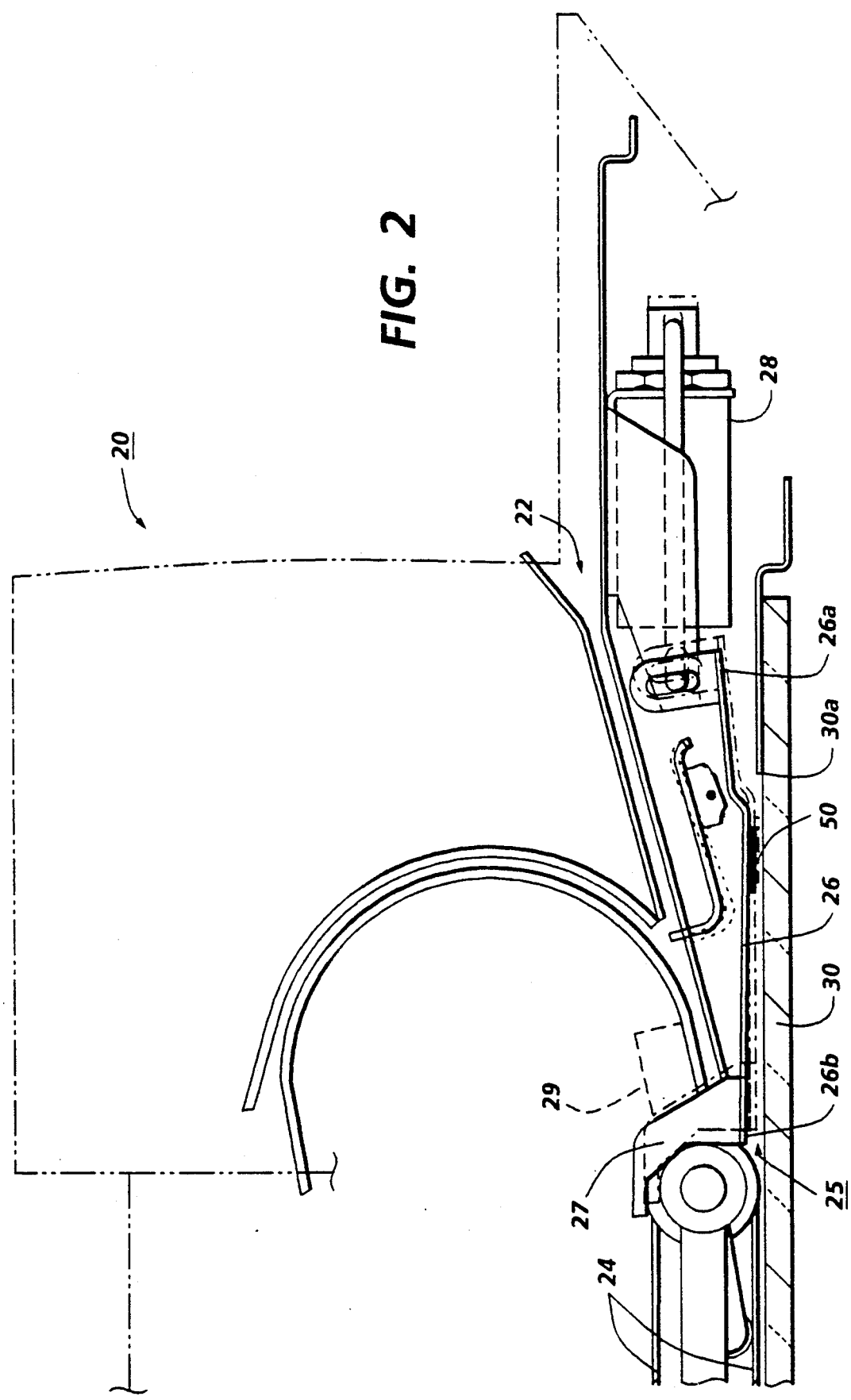
Figure 3:
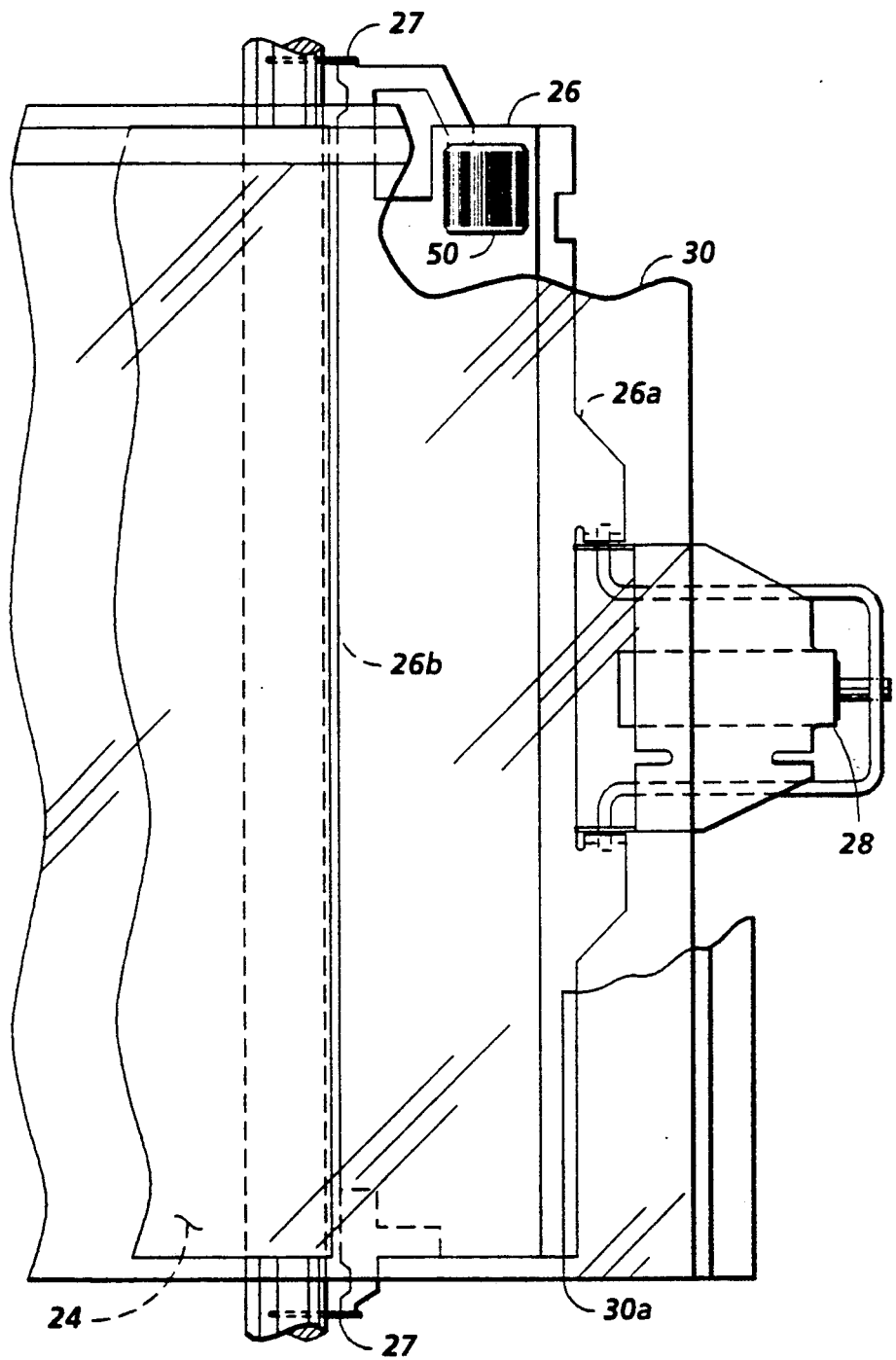

Various of the above-mentioned and further features and advantages will be apparent from the specific apparatus and its operation described in the example(s) below, as well as the claims. Thus the present invention will be better understood from this description of an embodiment thereof, including the drawing figures (approximately to scale), especially FIG. 3, wherein:

FIG. 1 is a schematic side view of one embodiment of the system of the invention, showing an exemplary RDH/SADH document handler and an exemplary electronic image scanning system therefor;

FIG. 2 is an enlarged view of the right hand portion of the document handler of FIG. 1 illustrating the SADH document input area pivotal baffle system for reverse feeding of oversize documents in the illustrated raised position; and FIG. 3 is a partial bottom view looking up through the platen in its upstream corner area which is the manual document placement imaging area (the corner registration position for manually positioned documents) to view the exemplary overlying optical bar code indicia on the baffle plate overlying this platen area.

Describing now in further detail the exemplary embodiment with reference to the Figures, this disclosed document-on-platen detection and control system is integral an electronic image scanning system 11, as illustrated. The electronic document imaging system 11 may be conventionally utilized for electronic imaging for a subsequent or integral printer. That is, the electronic optical scanning system 11 has a primary function of digitally reading document images on the imaging platen 30. In the present system, the same electronic document image scanning system 11 may also used on command to automatically scan, image and read the unique indicia signature of an exemplary optical bar code patch 50 overlying a preset portion of the imaging platen 30, if that bar code patch 50 is not occluded by any portion of a document present in that same preset portion of the platen 30. Here that preset portion 30 is the upstream corner area of the platen 30 used for manual document registration, as will be further described. That manual registration position here is desirably conventionally defined by the left edge of a conventional fixed manual registration edge strip member at 30a. That also defines the effective upstream platen edge 30a in this example. In this particular example, the bar code patch 50 is on a baffle plate 26 which is overlying this preset manual registration platen area position or portion. Also, in this example, this disclosed document-on-platen detection and control system is an integral part of an exemplary integral plural mode document handling and imaging system 10 with a plural mode document handler 20.

Referring first to the exemplary document handler 20, the particular document handler 20 disclosed here is merely one example of a document handler suitable for use with or control by the subject document detection and control system. Disclosed in this particular example is a dual mode document registration document handler 20, which has a special, different, mode of operation for large documents, e.g., 11"×17" or A3 documents. However, this is merely exemplary, and the present invention is not limited to any particular type of document handler or document feeder. In this particular document handler or feeder 20 large documents are preferably fed into the side entrance or SADH slot 22 of the document handler 20, as compared to normal size documents, which may also be inserted there but more typically are stacked in the top or RDH stacking tray 21.

The illustrated exemplary document handler 20 is an dual input RDH/SADH unit very much like that shown in the above-cited Xerox U.S. Pat. No. 4,579,444, issued Apr. 1, 1986, although FIG. 1 there is a reversed, mirror image, or rear view a compared to FIG. 1 here. Thus, this RDH/SADH 20, including its exemplary side or SADH entrance 22, may be basically as described in that patent, except as to the novel aspects described herein. Likewise, the RDH/SADH 20 and its drives and sensors are generally conventionally connected to and controlled by a conventional programmable controller 100, programmed as described herein.

That SADH entrance 22 path feeds documents out to the upstream end of the platen transport belt 24 and onto the platen 30 at an infeeding position 25 there. This infeeding position 25 at which the document is initially fed onto the platen 30 and acquired in the nip therewith of the platen transport belt 24 is substantially upstream of the upstream end 30a of the platen 30. Just upstream of this document infeeding position 25 here is a conventional document edge optical sensor 29 (corresponding to reference 31 in the cited U.S. Pat. No. 4,579,444). Here, there is also an underlying pivotal infeeding area light reflective baffle 26, preferably liftable by a solenoid 28 as will be later described, closely overlays the platen 30 in the area thereof extending from the platen upstream edge 30a to the infeeding position 25. As noted, this infeeding area light baffle 26 is otherwise somewhat similar that shown and described in XDJ Vol. 7, No. 4, July/August 1982, p. 275.

Also disclosed here schematically in FIG. 1 is an exemplary electronic image scanning system 11 scanning from under the platen 30 with a scanner 40 which may be mounted on and reciprocally driven by a typical horizontal optical scanning carriage. The electronic image scanning system 11 here provides for selective, programmable, scanning of up to the full length or the entire effective area of the platen 30, (see the movement arrows) to be able to image a document of any size which can be fitted onto the platen 30 upper surface, either manually or by the reverse feeding system also described herein. Preferably, the particular scanning length or distance in any given scan is normally limited to the approximately the length of the particular document being scanned at that time, measured from the desired registration edge position, to avoid unnecessary overscanning and provide faster scanning of sequentially fed and registered documents. However, as described herein, the scanning system 11 is programmable to start an initial scan starting from the upstream end 30a of the platen 30 to insure initial scanning of the area of the uniquely bar coded patch 50 (or scanning of an oversize or manually placed document). Conventionally, a document illuminating lamp and reflector light source may be located on the same scanning carriage.

The electronic imaging member 40 may be a conventional full width imaging bar or scan head CCD sensor array, preferably with an integral conventional lens strip such as a well known Selfoc TM multi-element lens or fiber optics array, as in U.S. Pat. No. 3,977,777, for example. Such electronic digitizing of the document image, for integral or separate digital copying, printing, facsimile transmission, and/or other digital image processing, enhancement, and/or manipulation, is rapidly becoming more important and critical, as compared to conventional copying with conventional light lens optical input, or the like. This is sometimes called an "EFE" or "electronic front end". Above-cited examples included Xerox Corporation U.S. Pat. Nos. 4,757,348, 4,295,167 and 4,287,536. The electronic image scanning may be bidirectional, as is known for example from Eastman Kodak U.S. Pat. No. 4,150,873 issued Apr. 24, 1979 to G. Dali and Xerox Corporation U.S. Pat. No. 4,205,350. Also, various electronic buffer and page collation systems may be connected to or made a part of the EFE, as disclosed in abovecited reference, IBM Corp. U.S. Pat. No. 4,099,254 or U.S. Pat. No. 4,213,694; Eastman Kodak Canadian 1,086,231 or UK 1 531 401; the Xerox Corporation "1200" and "9700" printers, etc..

With the document handler 20, normal sized documents may be automatically fed and registered and ejected entirely unidirectionally on the platen 30, in a generally conventional manner, with the servo-driven non-slip platen transport belt 24. Thus, normal size, automatically fed, documents in this disclosed document handler are registered in a registration position entirely under the platen transport belt 24, and downstream from the baffle 26. Thus, the area to be image scanned for such documents need not normally include the optical code patch 50.

However, with document handler 20, a large oversize document (only) is initially fed onto the platen 30 in the same manner and direction but then is automatically treated differently, in accordance with being sensed as being oversized as it is fed in, or as specified as oversized by the host controller 100. The large document feeding continues until the downstream or lead edge area of the large document is overfed past the downstream and 30b of the platen (so that the lead edge area of the document actually briefly enters into the document exit or post-platen ejecting area 31). At that point in time, the trail edge of the oversized document has passed the upstream document edge sensor 29 and the downstream edge 26b of the baffle 26 in passing through the infeeding position 25 so that the length and oversized nature of that document is known by the printer or copier controller 100. An oversized document includes any document which, at the feed-in point, exiting the infeeding position 25, would have any portion thereof extending beyond the downstream edge 30b of the platen 30, and would be imaged that way if handled as a normal document.

In response to the oversize information, the document platen transport is automatically reversed (but preferably operated at a much slower reverse speed than the forward speed), and the document is "backed-up" into a desired copying position registered relative to the upstream platen edge 30a. That same reverse document movement into the large document copying position moves the trail edge area of the large document back under the infeeding baffle 26, under and substantially past the SADH entrance path 22, 24, towards the upstream edge 30a of the platen. The reverse document movement of the oversize document may be stopped as the document reaches a special oversize document registration position of, e.g., about 4.45 mm away from the manual registration position. This special oversize document registration position allows for ample document positioning tolerances. As noted, that manual registration position is at 30a here, and is conventionally defined by the left edge of a conventional fixed manual registration edge strip member, which also defines the effective upstream platen edge 30a in this example. This reverse feeding of the previously trailing edge of the oversized document is into the substantial upstream extension area of the platen extending upstream from the document infeeding position 25 and the platen transport 24 up to close to the upstream platen edge 30a (a distance of preferably more than 10 centimeters). Such a platen extension are per se is also shown in said U.S. Pat. No. 4,579,444 and the corresponding Xerox Corporation "1065" copier. However, there that upstream extension area of the platen is only available fro manually placed documents.

It is desirable that the platen transport 24 be smaller and shorter than the platen 30, so as to have a shorter document recirculation loop path length to and from tray 21 for regular sized documents, yet not preclude feeding (rather than manual handling) of larger documents onto the platen 30 for imaging. This is provided here, as described. The disclosed system of automatic document registration allows a smaller RDH to be used, with a smaller overall document recirculation path for normal size documents, on a larger platen, large enough to allow full imaging of substantially large documents thereon, yet which larger documents are also automatically, rather than manually, fed and registered on the same platen. The disclosed system of automatic document registration allows documents to be fed onto a large area imaging platen 30 at an infeeding position 25 substantially downstream of the upstream end 30a of the large platen 30, to provide a shorter unidirectional path for normal sized documents, yet can utilize the full area of this large platen 30, including the extended platen area upstream of the infeeding position 25, to stationarily image large documents thereon.

As noted, this particular document handling system 20 does not automatically register normal size documents by backing them up under the document input area 25. Normal documents which are fed onto the platen automatically (rather than manually placed on the platen) are registered by unidirectionally feeding downstream into their desired registration position, as described in said U.S. Pat. No. 4,579,444, or otherwise, although here the registration is preferably document trail edge based rather than lead edge based. That is, the normal sized documents are automatically registered and imaged fully under the platen transport belt 24, not under the baffle 26. The backing-up of a document, and the coordinated lifting of the baffle 26 downstream end 26b by solenoid 28 as described herein, is automatically actuated only for documents which are sensed or otherwise indicated as being oversized. All documents are feed in onto the platen 30 through the normal SADH or RDH input path guide baffles leading to input area 24, as shown, which baffles are above the baffle 26. The end of these document entrance baffles provides a document infeeding entrance position at the input area 25 which the trail edge of the documents must clear or exit.

A normal document only passes above, without normally contacting, the baffle 26. However, if desired in that lowered or normal position the upper surface of the baffle 26 near downstream lip 26b may also provide a low friction guide surface to help guide a lead edge of an incoming document into the infeeding position 25 and into the nip between the platen transport 24 and the platen 30.

For normal sized documents the baffle 26 primarily provides a light baffle or uniform platen imaging light reflective background cover, as noted, to prevent "show around" shadow images outside of the normal sized document area during its imaging. The baffle 26 is preferably a thin lightweight and generally planar light reflective member underlying the document infeeding area 22, 25 and overlying the above-described upstream platen extension area.

To assist in this reverse movement of the large document into the registration/copying position, the baffle 26 here provides another, additional, function. The baffle 26 is preferably pivotably mounted relative to the plane of the platen 30 so as to tilt or be slightly liftable at one edge, as described below or in any other suitable manner, for the reverse movement of an oversize document, so that the baffle 26 can function as a gate or stripping finger to assist in the reverse feeding of oversized documents thereunder. One example, of many possible alternatives, of a mechanism for slightly lifting up the downstream end 26b of baffle 26 is by actuation of a solenoid 28 as shown in FIG. 2. The solenoid 28 may be actuated in timed coordination with the other components of the DH 20, upon sensing of an oversized document, as illustrated in FIG. 3. In the example here, the solenoid 28 is connected to the upstream end 26a of the baffle 26, and horizontal movement downstream of the baffle 26 by actuation of the solenoid 28 causes the inclined planar cam surfaces of lift fingers 27 integral this baffle 26 adjacent its downstream end 26b (but outside of the document path) to ride up on outside extensions of the upstream roller shaft of the platen transport 24. That correspondingly raises the downstream lip 26b of the baffle 26 away from the platen 30 and above the plane of the platen transport bet 24 lower flight. In that raised position, shown in solid lines versus phantom in FIG. 2, the baffle lip 26b and associated (now inclined) lower surface of this baffle 26 in effect becomes a stripping gate or deflector to ensure that the previously trailing edge of the now reversed movement large document will back up under, rather than over, the baffle 26.

When the solenoid 28 is not actuated, the baffle 26 is dropped or lowered into its normal generally horizontal position directly overlying the platen 30, by being lowered substantially into that plane. Preferably the lower surface of the baffle 26 is normally allowed to rest directly and flatly on the platen 30 upper surface by gravity when the solenoid is 28 is disengaged. i.e., preferably here the input path of a large document as well as a normal document is above or over the top of the baffle 26, and with the baffle in its lowered position, as previously noted.

The de-actuation of the solenoid 28 to drop the baffle 26 down also helps hold any oversized document area which may be under the baffle 26 down flat against the platen, thus serving as a platen cover for that portion of the document underlying the baffle. The baffle 26 provides a white background imaging area overlying this area of a large document.

Thus, to summarize the DH 20 operation, in the case of a detected oversized document, preferably the baffle 26 is initially down for document input, raised and tilted during at least the initial reverse movement of the oversized document as it is being fed into a special registration position partially under the baffle 26, and then the baffle 26 is promptly lowered onto that portion of the oversized document before imaging. If desired, the baffle 26 may again be raised temporarily for the downstream document ejection of the oversize document after imaging, so as not to substantially drag on the document as it is being removed. In contrast, in the case of normal sized documents, the solenoid 28 need never be actuated and the baffle 26 can stay down flat directly on top of the area of the platen it overlies at all times.

Turning again to the specific document-on-platen detection system of the invention, as noted above, documents to be imaged by manual rather than automatic document placement on the imaging platen 30 are positioned in a special manual document placement imaging registration position in which one corner of the document is registered to a corner registration position, here at the right front corner of the platen 30 at the effective upstream platen edge 30a defined by a conventional copier fixed registration edge member or ruler. Conventional edge guide marks or registration marks may be provided thereon. This manual document placement and registration is done with the entire document handling unit 20 pivotally lifted up away from the platen 30, as is conventional. Note that this manual registration and imaging position is not the same as the registration position on the platen for fed documents, i.e., documents fed and registered by the document handler 20, as described above. Here, this manual placement document imaging registration position is a different position from the registration and imaging positions on the imaging platen for automatic or semiautomatic document feeding by the document feeder, even though all documents may be read by the same scanned electronic document imager 40.

In the special manual registration position, once the document is in place and the document handling unit 20 is closed down again over the platen 30, the registered corner of the document, of any size, no matter how small (assuming it is not smaller than about 5 mm by 5 mm), is under the optical bar code patch pattern 50 on the overlying stationary imaging background surface member provided by the baffle plate 26. As shown, especially in FIG. 3, the bottom surface of baffle plate 26 is painted or printed with a unique optical indicia, preferably the uniquely numbered optical bar code patch pattern 50. This bar code patch 50 is located directly overlying the above-described manual document registration corner position or area, and is within the depth of field or focus of the electronic document imager 40 when it is scanned thereunder in its normal document scanning path under the platen 30. Thus any manually registered document (except for a clear transparency unimaged in this same corner area, or a document smaller than about 5 mm by 5 mm), will underline and optically occlude the bar code patch 50 from being read by the electronic document imaging system 11. That is, when the electronic imager 40 is programmed to scan over this area, and there is a document in this area, the imager 40 will not "see" or read the pattern 50 and thus not produce a corresponding numerical code output. In contrast, if no document is present in the manual registration corner the pattern 50 is not occluded and the electronic document imaging system 11 can read the pattern 50 to generate a unique electrical control signal therefrom, e.g., a number such as "99", or the like. All of the bars of the bar code pattern 50 must be unobstructed by any part of a document or document image thereunder for the unique numerical signal to be generated. Thus, a larger area and much more reliable and positive document presence sensing is provided than could be provided by a conventional optical beam document presence sensor. Also, no such additional hardware is required.

The unique bar code pattern 50 is not used on any documents, or on any job slip sheets or job ticket type documents, even though the latter may also desirably be bar coded (to produce different control signals) as described in the above-cited Xerox Corporation U.S. Pat. No. 4,757,348 or U.S. Pat. No. 4,716,438. That is, the bar code pattern 50 may actually desirably be of the same general type as is used for such job separator control sheets fed in lieu of or intermixed with other document sheets, and read by the same imager 40, but the bar code pattern 50 is unique and does not have the same "number" or output signal as is printed on any of such job control sheets.

Preferably the bar code patch symbol 50 overlaps the front or rear edge registration strip of the platen (depending on which platen corner is being used), and is very close (within 3-4 mm) to the upstream platen registration edge 30a defined here by the mechanical registration edge strip shown here on the right hand end of the platen glass.

Manual document registration is not the normal mode of registration with a document handler, since automatic document feeding and registration is faster and more covenient. However, manual registration is a necessary or desirable customer optional feature for especially delicate or flimsy documents, photos, overlays, paste-ups, etc.. As taught in the above art, however, a long standing problem is the tendency of operators to accidentally leave a manually placed document on the platen after it is copied, unless it is automatically sensed and the operator is promptly warned by a visual display to remove it. Furthermore, in a plural mode document handling system with automatic feeding, if a previously manually placed document is not removed from the platen before automatic feeding of another document, either undesired mechanical ejection of the document or a misfeed or jam may occur. [A manually placed and registered document is normally also desirably manually removed, requiring lifting the platen cover unit again]. With an electronic imaging system as here, where sequentially imaged document images are being electronically captured and stored for later use, such as for subsequently printing books in collated page order, there is an additional problem in that a document left on the platen may be inadvertently electronically imaged twice. Also, automatic mode selection is not infallible, so an inadvertent second imaging of a document is possible, although unlikely.

This manual registration corner of the platen at 30a is not covered by the platen transport belt 24, and is upstream thereof in the document feeding direction. This is an important distinction, not only for the control system herein, but also since it is not desirable to print such a visible control indicia 50 on the surface of belt 24, which would change position as the belt is driven, become contaminated or worn, etc., in contrast to desirably printing the optical control indicia 50 on a stationary surface, such as the baffle plate 26 here.

To summarize, documents in the other, automatic, imaging positions on the platen 30 provided by automatic or semiautomatic document feeding do not normally occlude the unique optical indicia 50, and the optical indicia 50 is not within these normal fed document imaging positions, so as not to be accidentally imaged or to potentially interfere with the document feeding. Normally those documents fed onto the imaging platen 30 by the document feeder 20 for imaging are registered in a downstream position on the platen calculated from the trailing edge of those documents as fed to and by the platen transport belt system 24, such that the document is completely under this wide fricition document belt 24, with the exception only of oversize documents. In contrast, manually registered documents are registered to an upstream edge area 30a of the platen 30 upstream of the platen transport belt 24 and underlying the stationary baffle 26, with the manually registered upstream corner of the document underlying the imprinted unique optical bar code pattern 50.

In the case of oversize documents, even if the bar code 50 is blocked by the oversize document, and that area is scanned, the bar code presence/absence control signal can be suppressed by the controller 100 in that mode, since the controller 100 knows that the system has just fed an oversize document as the last document.

Furthermore, documents manually placed on the platen for imaging are not fed in from the SADH slot or the RDH tray and do not trigger document presence or input sensors, whereas documents loaded therein for automatic feeding do. Also, manually loaded documents are indicated or signaled by the prior lifting of the platen cover, which is conventionally detected by a platen cover opening switch.

The combination of such document inputs and sequences can be used to automatically determine when a document on-platen detection mode or scan sequence is desired. For example, if the platen cover was just lifted, and no documents were loaded for being automatically fed, then manual document loading (a manual job) can be assumed, and no prescan need normally be conducted. In comparison, if automatic document feeding is now being requested by loading of documents into an automatic document feeder input of the DH 20, especially normal documents loaded in the RDH top tray, and especially if the last scan was an imaging scan of a manual job, then a document-on-platen detection prescan may desirably be automatically initiated from that combination of input information.

When it is determined that document-on-platen detection is desired, i.e., when the mode of operation and sensor inputs indicates to the controller 100 program that a platen scan (or perscan) request is appropriate, then, after a platen scanning (document imaging) request has been made, the electronic document scanner 11 first starts a scan adjacent the upstream platen edge 30a, across the area of the unique bar code 50, prior to any document feeding, and prior to scanning other imaging positions on the imaging platen which are provided for automatic document feeding. That is, the system automatically initiates and utilizes a special platen prescan scenario for checking for a document on the platen glass prior of initiating any automatic document feeding sequence. In that special scanning sequence, the absence of a unique electrical control signal by not imaging the unique bar code 50 by the imager 40 in at least in that initial part of that scan (i.e., by not seeing the bar code 50 in that limited area) can be treated as a fault code. The bar code patch 50 may be detected or not detected by the imaging system 11 within the first 5 cm of this special scan. As processed by the image processing electronics, the initial absence of the unique bar code output signal in this special mode indicates that the bar code 50 is occluded by a document thereunder. Thus, even by processing only the first few lines of this special image scan in this arrangement, the controller 100 of the host system 11 has sufficient information to abort any current image capture, and instruct the operator to take corrective action. This provides a control signal for inhibiting the operation of the document handling or feeding apparatus 20, for preventing feeding of documents to the imaging platen 30 until that sensed document is removed. The conventional operator control screen display (connecting with the controller 100) is also preferably programed to display instructions to the operator to remove the sensed document.

Thus, this same unique control signal information may be utilized for operator displays and/or inhibiting or otherwise controlling the operation of an integral document handling or feeding apparatus for feeding or not feeding documents to the document imaging platen, and/or providing document input mode selection, and/or imaging area or image scanning position selection, and/or preventing duplicate image capture of the same document, and/or preventing potential fault conditions, operator confusion and/or recovery time loss, and/or jams or document damage in cases where a previously manually placed document is inadvertently left on the platen and document feeding of other documents is attempted, etc..

If additional confirmation is desired for the implication from the non-reading of the unique bar code that a document is present on the platen, another scan could be utilized to confirm the indication. The scanner can be utilized to check for a document presence, e.g., by optically looking for a document edge.

While the subject unique bar code is on a separate baffle member in this specific example, in a scanner with a fixed platen cover or other such platen overlying member a similar bar code could be applied in a similar position and similarly read or not read for sensing the absence or presence of a document on the platen.

While the embodiment disclosed herein is preferred, it will be appreciated from this teaching that various alternatives, modifications, variations or improvements therein may be made by those skilled in the art, which are intended to be encompassed by the following claims:

What is claimed is:

1. In an electronic document imaging system, with a document imaging platen and an electronic document imager for electronically imaging a document on said imaging platen, the improvement comprising:

an automatic document detection system for detecting the presence or absence of a document registered in an imaging position on said document imaging platen utilizing said same electronic document imager, said automatic document detection system including a platen overlying member of said electronic document imaging system bearing a unique optically readable indicia different from normal optically readable document indicia, said unique optically readable indicia being in a predetermined position superposed over a predetermined portion of said document imaging platen in a predetermined area of said imaging position, said unique optically readable indicia being positioned to be optically occluded by a document on said document imaging platen which is registered in said imaging position so as not to be fully readable by said electronic document imager, and said unique optically readable indicia being positioned to be optically imaged and read by said same electronic document imager to provide a correspondingly unique control signal when a document is not present in said predetermined area of said imaging position, wherein said imaging position is a special manual document placement imaging registration position, in which manual placement registration position at least one corner of the document is placed under said platen overlying member and said unique optically readable indicia thereon.

2. The electronic document imaging system of claim 1, wherein said electronic document imaging system includes an integral document feeder for automatically feeding documents to said document imaging platen, and said control signal is operatively connected to enable the operation of said document feeder in response to said unique control signal indicating that a document is not present on document imaging platen in said predetermined area of said imaging position.

3. In an electronic document imaging system, with a document imaging platen and an electronic document imager for electronically imaging a document on said imaging platen, the improvement comprising:

an automatic document detection system for detecting the presence or absence of a document registered in an imaging position on said document imaging platen utilizing said same electronic document imager, said automatic document detection system including a platen overlying member of said electronic document imaging system bearing a unique optically readable indicia different from normal optically readable document indicia, said unique optically readable indicia being in a predetermined position superposed over a predetermined portion of said document imaging platen in a predetermined area of said imaging position, said unique optically readable indicia being positioned to be optically occluded by a document on said document imaging platen which is registered in said imaging position so as not to be fully readable by said electronic document imager, and said unique optically readable indicia being positioned to be optically imaged and read by said same electronic document imager to provide a correspondingly unique control signal when a document is not present in said predetermined area of said imaging position, wherein said imaging position is a special manual document placement imaging registration position, in which manual placement registration position at least one corner of the document may be manually placed under said platen overlying member and said unique optically readable indicia thereon, and wherein said electronic document imaging system includes an integral document feeder for automatically feeding documents into at least one other, different, automatic registration position on said document imaging platen in which said unique optically readable indicia is not optically occluded by said automatically fed documents, and wherein said control signal is operatively connected to enable the operation of said document feeder is response to said unique control signal indicating that a document is not present on said document imaging platen in said manual placement registration position.

4. The electronic document imaging system of claim 3, wherein said integral document feeder includes a moving document platen transport partially overlying said document imaging platen, and wherein said platen overlying member and said unique optically readable indicia thereon and said manual placement registration position extend over an upstream portion of said document imaging platen not overlaid by said document platen transport, and said platen overlying member is separate from and does not move with said document platen transport, and wherein said electronic document imager scans said imaging platen for said document imaging, starting said scan from said upstream portion of said imaging platen in which said unique optically readable indicia is located.

5. The electronic document imaging system of claim 3, wherein said control signal is additionally operatively connected to enable operator displays, document input mode selection, imaging area or image scanning position selection, preventing duplicate image capture of the same document, preventing potential fault conditions, or document jams or damage in cases where a previously manually placed document is inadvertently left on said platen and document feeding of other documents is attempted.

6. The electronic document imaging system of claim 4, wherein said manual placement registration position is corner registered to a corner area of said document imaging platen upstream of said document platen transport and said upstream corner area of said document imaging platen is stationarily overlaid by said platen overlying member and said unique optically readable indicia thereon.

7. The electronic document imaging system of claim 4, wherein said platen overlying member is a pivotable light reflective imaging background baffle plate member overlying an area of said document imaging platen between said document platen transport and the end of said document imaging platen from which documents are fed onto said document imaging platen, which baffle plate member is closely adjacent and generally coplanar said document imaging platen for document imaging, but pivotable for document feeding thereunder.

8. The electronic document imaging system of any of claim 1, 2, 3, 4, 5, 6 or 7, wherein said unique optically readable indicia is a numerical bar code pattern patch readable by said electronic document imager, when not at least partially occluded by a document on said document imaging platen, as a unique bar code number not used on any document to be imaged.

9. In an electronic document imaging process in which a document is electronically imaged on a document imaging platen by an electronic document imager after the document has been registered in an imaging position on the imaging platen, the improvement wherein:

an optically detectable signal generating indicia is overlaid over a portion of the imaging platen during document imaging within focus of and optically readable by the electronic document imager, a document for which manual handling is desired is manually placed and positioned in a first, manual, registration position on the imaging platen in which at least one corner of said manually placed document is interposed between said signal generating optical indicia and the electronic document imager to at least partially optically occlude said optical indicia from being read by said electronic document imager, a document for which automatic feeding is desired is placed in a document feeder and that document is fed thereby onto the imaging platen into a second, different, registration position on the imaging platen, in which second registration position no portion of that document is interposed between said signal generating optical indicia and the electronic document imager and the signal generating optical indicia is optically read by said electronic document imager to provide a unique control signal responsive thereto.

10. The electronic document imaging process of claim 9, wherein said optically detectable signal generating indicia is a unique bar code pattern, not used on any document to be imaged, read by said electronic document imager, when not optically occluded by any portion of a document, as a unique code number to provide said unique control signal.

11. The electronic document imaging process of any of claims 9 or 10, wherein said optically detectable signal generating indicia is on an imaging background baffle plate member stationary positioned over one edge area of the imaging platen during document imaging.

12. The electronic document imaging process of any of claims 9 or 10, wherein said document feeder feeds documents into said second document registration position with an over-platen document platen transport, and said first manual placement document registration position is corner registered to a corner of the platen not covered by this platen transport and overlaid by a stationary imaging background surface member with said optically detectable signal generating indicia.

13. The electronic document imaging process of any of claims 9 or 10, wherein said electronic document imager is scanned under the document imaging platen for said document imaging, and wherein the start of said scanning starts in said manual registration position with first scanning the area of said optically detectable signal generating indicia, which is a unique optical pattern imprinted on a planar member held in a fixed position.

14. The electronic document imaging process of any of claims 9 or 10, wherein said electronic document imager is scanned under the document imaging platen for said document imaging, and wherein the start of said scannnig starts in said manual registration position with said optically detectable signal generating indicia, prior to scanning the registration position for those documents fed onto the imaging platen by said document feeder for imaging, which are registered in a downstream position on said platen calculated and fed from the trailing edge of those documents by a platen transport belt system of said document feeder, whereas documents manually placed on said platen for imaging are registered to an upstream edge area of said platen upstream of said platen transport belt system and underlying a stationary imaging background surface member imprinted with said optically detectable signal generating indicia.

15. The electronic document imaging process of any of claims 9 or 10, wherein said electronic document imager is scanned starting in a special document-on-platen prescan, automatically initiated in response to a preselected combination of document input conditions, under a manual registration position underlying a stationary imaging background surface member imprinted with said optically detectable signal generating indicia.

* * * * *